United States Patent
Sarwar et al.

(10) Patent No.: US 10,558,722 B2
(45) Date of Patent: Feb. 11, 2020

(54) PROVISION OF ON PREMISE AMBIENT SERVICE METHOD AND APPARATUS

(71) Applicant: Intel Corporation, Santa Clara, CA (US)

(72) Inventors: Usman Sarwar, Penang (MY); Anil Kumar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/476,803

(22) Filed: Mar. 31, 2017

(65) Prior Publication Data

US 2018/0286155 A1 Oct. 4, 2018

(51) Int. Cl.
*G06F 16/9535* (2019.01)
*G06F 16/335* (2019.01)
(Continued)

(52) U.S. Cl.
CPC ........ *G06F 16/9535* (2019.01); *G06F 16/337* (2019.01); *G06K 9/00771* (2013.01);
(Continued)

(58) Field of Classification Search
CPC ........... G07C 9/00087; G07C 9/00158; H04N 5/23206; H04N 7/186; H04N 7/18;
(Continued)

(56) References Cited

U.S. PATENT DOCUMENTS 6,967,575 B1 * 11/2005 Dohrmann ........... A47G 29/141
220/592.01
8,375,118 B2 * 2/2013 Hao ....................... G05B 15/02
709/223
(Continued)

FOREIGN PATENT DOCUMENTS

WO WO2016109383 A1 7/2016

OTHER PUBLICATIONS

Xiang Su et al., "Knowledge-based Systems for Ambient Social Interactions," Department of Computer Science and Engineering and Info Tech Oulu, University of Oulu, Finland and Department of Electronics, Military University of Technology, Warsaw, Poland, Oct. 15, 2012, 11 pages.
(Continued)

*Primary Examiner* — Brian E Miller
(74) *Attorney, Agent, or Firm* — Schwabe, Williamson & Wyatt, P.C.

(57) ABSTRACT

Ambient service apparatuses and methods associated with providing ambient service in a premise are disclosed herein. In embodiments, an apparatus for providing on premise ambient service may be provided. The apparatus may include a profile engine to interact with a cloud ambient service provider to receive at least one of a profile of a user of a premise or a profile of one or more visitors of the premise, wherein the profiles are associated with the provision of ambient service to a visitor of the premise on behalf of the user. The apparatus may further include a management module coupled to the profile engine to interact with one or more peripherals at the premise to provide ambient service to one or more visitors of the premise, on behalf of the user, based at least in part on the user or visitor profile. Other embodiments may be disclosed or claimed.

23 Claims, 7 Drawing Sheets

(51) Int. Cl.
*H04L 29/08* (2006.01)
*G06K 9/00* (2006.01)
*G07C 9/00* (2020.01)
*H04L 29/06* (2006.01)

(52) U.S. Cl.
CPC ........ *G07C 9/00087* (2013.01); *H04L 67/306* (2013.01); *H04L 63/0861* (2013.01)

(58) Field of Classification Search
CPC ............... G06F 17/30702; G06F 21/32; G06F 17/30867; G06F 16/9535; G06F 16/337; G06F 21/31; H04L 67/306; H04L 63/0861; G06K 9/00771; G06Q 50/01
See application file for complete search history.

(56) References Cited

U.S. PATENT DOCUMENTS

| | | | | |
|---|---|---|---|---|
| 9,600,645 | B2* | 3/2017 | Fadell | G08B 27/003 |
| 9,652,912 | B2* | 5/2017 | Fadell | G07C 9/00103 |
| 2004/0170262 | A1* | 9/2004 | Ohno | H04L 12/2803 |
| | | | | 379/167.12 |
| 2006/0090079 | A1* | 4/2006 | Oh | G07C 9/00087 |
| | | | | 713/186 |
| 2007/0052536 | A1* | 3/2007 | Hawkes | G08B 15/002 |
| | | | | 340/540 |
| 2007/0193834 | A1* | 8/2007 | Pai | G06Q 10/08 |
| | | | | 186/3 |
| 2011/0074570 | A1* | 3/2011 | Feldstein | H04L 12/2825 |
| | | | | 340/539.11 |
| 2011/0115906 | A1* | 5/2011 | Su | H04N 7/186 |
| | | | | 348/143 |
| 2012/0019795 | A1 | 8/2012 | Postma et al. | |
| 2012/0310899 | A1* | 12/2012 | Wasserman | G06F 17/30569 |
| | | | | 707/687 |
| 2013/0057695 | A1* | 3/2013 | Huisking | H04N 7/186 |
| | | | | 348/156 |
| 2014/0001596 | A1 | 1/2014 | Moore et al. | |
| 2014/0169335 | A1* | 6/2014 | Franklin | H04W 8/082 |
| | | | | 370/332 |
| 2014/0185434 | A1* | 7/2014 | Kim | H04L 41/0668 |
| | | | | 370/228 |
| 2014/0225729 | A1* | 8/2014 | Scannell | H04W 68/00 |
| | | | | 340/539.11 |
| 2014/0266669 | A1* | 9/2014 | Fadell | G05B 19/042 |
| | | | | 340/501 |
| 2015/0116106 | A1 | 4/2015 | Fadell et al. | |
| 2015/0127712 | A1* | 5/2015 | Fadell | G06Q 10/083 |
| | | | | 709/202 |
| 2015/0145643 | A1* | 5/2015 | Fadell | G06Q 10/083 |
| | | | | 340/5.51 |
| 2015/0310381 | A1* | 10/2015 | Lyman | G06Q 10/083 |
| | | | | 705/330 |
| 2015/0323943 | A1 | 11/2015 | Chan et al. | |
| 2016/0033966 | A1* | 2/2016 | Farris | G01C 21/00 |
| | | | | 701/15 |
| 2016/0080907 | A1 | 3/2016 | Saleem | |
| 2016/0104062 | A1 | 4/2016 | Costantino et al. | |
| 2016/0105644 | A1* | 4/2016 | Smith | H04N 5/23206 |
| | | | | 348/159 |
| 2016/0125676 | A1* | 5/2016 | Pouille | G07C 9/00031 |
| | | | | 340/5.7 |
| 2016/0234346 | A1* | 8/2016 | Degani | H04L 67/04 |
| 2016/0308686 | A1* | 10/2016 | Vijayrao | H04L 12/2803 |
| 2017/0163435 | A1* | 6/2017 | Ehsani | H04L 12/282 |
| 2017/0311053 | A1* | 10/2017 | Ganjam | H04Q 9/00 |
| 2018/0084066 | A1* | 3/2018 | Tague | H04L 67/22 |
| 2018/0088895 | A1* | 3/2018 | Pedersen | G06F 3/165 |

OTHER PUBLICATIONS

Ekaterina Gilman et al., "Towards interactive smart space," Journal of Ambient Intelligence and Smart Environments 5, Department of Computer Science and Engineering and Infotec Oulu, University of Oulu, Finland, Apr. 1, 2013, 18 pages.

International Search Report and Written Opinion dated Jun. 4, 2018 for International Application No. PCT/US2018/019768, 15 pages.

* cited by examiner

PROVISION OF ON PREMISE AMBIENT SERVICE METHOD AND APPARATUS

TECHNICAL FIELD

The present disclosure relates to the fields of Internet of Things and Smart Spaces, in particular, to providing ambient services to a user and/or various visitors in a premise.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Current spaces, such as homes and buildings, require the presence of humans to receive visitors to the premises, such as guests and strangers. The humans not only interact with the visitors, but if they are expected, the human may prepare the premises for their arrival, and for any needs of a user for interacting with them. If the owner/user or his representative, such as a housekeeper or family member, is not available at the premise, the visit very likely will not be successful. For example, if a guest arrives at a previously agreed upon meeting, and the owner is stuck in traffic while driving home, the guest may stand at the door and not know what to do, or may simply leave. Or, for example, if no one is at an office, a postman arriving with a parcel for which a signature is required may need to re-deliver, or require the owner or company representative to go to the post office to collect it.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
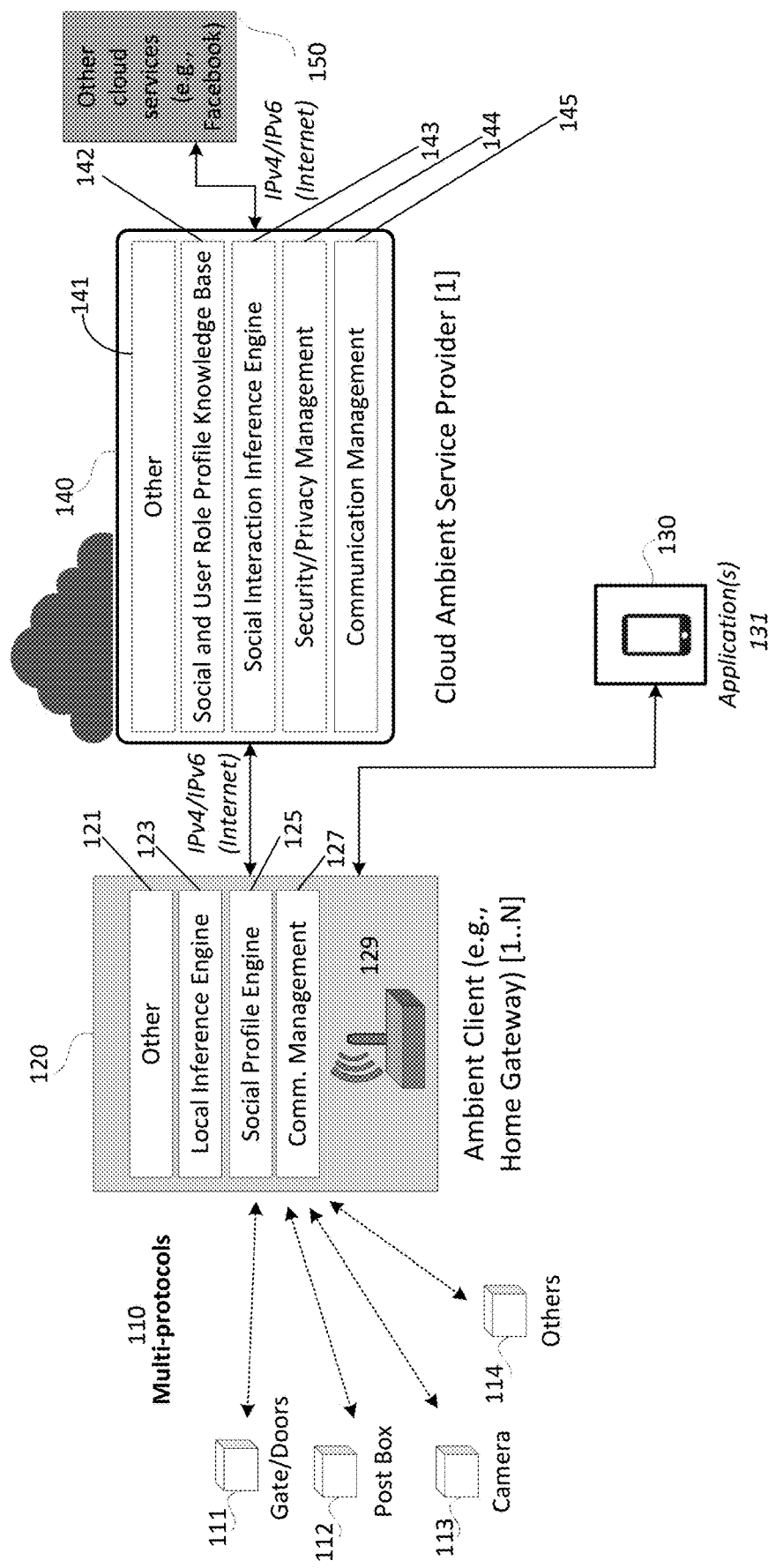
FIG. 1 illustrates a system to provide ambient service in a premise, in accordance with various embodiments.

Ambient service apparatuses and methods associated with providing ambient service in a premise are disclosed herein. In embodiments, an apparatus for providing on premise ambient service may be provided, the apparatus being disposed in the premise. The apparatus may include a profile engine to interact with a cloud ambient service provider to receive at least one of a profile of a user of a premise or a profile of one or more visitors to the premise, wherein the profiles are associated with the provision of ambient service to a visitor of the premise on behalf of the user. The apparatus may further include a management module coupled to the profile engine to interact with one or more peripherals at the premise to provide ambient service to one or more visitors of the premise, on behalf of the user, based at least in part on the user or visitor profile. In embodiments, visitors to the premise may be known guests, such as relatives and friends, or strangers, some expected, and some arriving unannounced.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Also, it is noted that embodiments may be described as a process depicted as a flowchart, a flow diagram, a dataflow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function. Furthermore, a process may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used hereinafter, including the claims, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may implement, or functions associated with the circuitry may be implemented by, one or more software or firmware modules.

As used hereinafter, including the claims, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

As used hereinafter, including the claims, the term "computing platform" may be considered synonymous to, and may hereafter be occasionally referred to, as a computer device, computing device, client device or client, mobile, mobile unit, mobile terminal, mobile station, mobile user, mobile equipment, user equipment (UE), user terminal, machine-type communication (MTC) device, machine-to-machine (M2M) device, M2M equipment (M2ME), Internet of Things (IoT) device, subscriber, user, receiver, etc., and may describe any physical hardware device capable of sequentially and automatically carrying out a sequence of arithmetic or logical operations, equipped to record/store data on a machine readable medium, and transmit and receive data from one or more other devices in a communications network. Furthermore, the term "computing platform" may include any type of electronic device, such as a cellular phone or smartphone, a tablet personal computer, a wearable computing device, an autonomous sensor, personal digital assistants (PDAs), a laptop computer, a desktop personal computer, a video game console, a digital media player, an in-vehicle infotainment (IVI) and/or an in-car entertainment (ICE) device, a vehicle-to-vehicle (V2V) communication system, a vehicle-to-everything (V2X) communication system, a handheld messaging device, a personal data assistant, an electronic book reader, an augmented reality device, and/or any other like electronic device.

As used hereinafter, including the claims, the term "link" or "communications link" as used herein may refer to any transmission medium, either tangible or intangible, which is used to communicate data or a data stream. Additionally, the term "link" may be synonymous with and/or equivalent to "communications channel," "data communications channel," "transmission channel," "data transmission channel," "access channel," "data access channel," "channel," "data link," "radio link," "carrier," "radiofrequency carrier," and/or any other like term denoting a pathway or medium through which data is communicated. As used hereinafter, including the claims, the terms "module" "local inference engine", "social profile engine", "communications management module", "social interaction inference engine", "security/privacy management module" and "communication management module", may refer to, be part of, or include one or more Application Specific Integrated Circuits (ASIC), electronic circuits, programmable combinational logic circuits (such as field programmable gate arrays (FPGA)) programmed with logic to perform operations described herein, a processor (shared, dedicated, or group) and/or memory (shared, dedicated, or group) that execute one or more software or firmware programs generated from a plurality of programming instructions with logic to perform operations described herein, and/or other suitable components that provide the described functionality.

Referring now to FIG. 1, wherein a system for providing on premise ambient service according to the present disclosure, in accordance with various embodiments, is illustrated. As shown, system 100 may include apparatus 120 provided in a premise, for example a residence, an office or another milieu where other persons besides a user associated with the premise may or are expected to visit. Apparatus 120 may be referred to as an Ambient Client, as shown. Apparatus 120 may be one or more hardware devices and/or one or more software modules that carry out the provision of ambient services operations in a premise and control the storage and use of profiles and related data. In embodiments, the one or more hardware devices may be tamper resistant and the operations may be carried out independent of processor(s) of a host/application platform. In embodiments where apparatus 120 is implemented as one or more software modules, the software modules may include "enclaves" which may be isolated regions of code and/or data within the memory of a computing platform.

Apparatus 120 may communicate with a cloud ambient service provider 140 of system 100, as described below. In embodiments, apparatus 120 may include social profile engine 125, which may receive social profiles from cloud ambient service provider 140 that are relevant to the user and/or various visitors of the premise. In embodiments, apparatus 120 may also include local inference engine 123 to, based on stored social profiles and information obtained from persons in the premise, provide ambient service to various visitors to the premise, or support the interaction between a user and a visitor to the premise. Further, apparatus 120 may include a communications management module 127, which controls the various peripherals 111-114 in the premise to effectuate the ambient service decided to be provided by local inference engine 123. Communications management module 127 may be one or more software modules that operate in conjunction with one or more hardware devices to configure the communications circuitry or modem 129 to communicate with one or more of peripherals 11-114 using one or more multiple wireless protocols 110.

Apparatus 120 may additionally be expanded to include other module(s), indicated in FIG. 1 as other 121. In embodiments, apparatus 120 may communicate wirelessly, via communications circuitry or modem 129, with a set of peripherals 111-114 disposed in the premise. In some embodiments, one or more peripherals 111-114 may be coupled to apparatus 120 via a wired connection. Apparatus 120 may communicate with peripherals 111-114 via one or multiple protocols 110, as may be necessary or desired. The peripherals in the premise with which apparatus 120 communicates, and thus controls via communication management module through communications circuitry 129, which may, in embodiments, be a modem or transceiver, may include, for example, a gate or door 111, a post box or mail box 112, a camera 113, and various other devices 114.

In embodiments, as shown, apparatus 120 may interact with one or more applications 131 running on a mobile telephone or other user device 130. Using such an application 131, a user may send (or receive) information of various types to (and from) apparatus 120. This information may include preferences as to how to handle various visitors, such as what should be played, what food should be served, and so forth. Or, the information may include a list of appointments with expected visitors, for which apparatus 120 may use already known preferences when dealing with them.

As shown in FIG. 1, there may be numerous apparatuses 120 deployed in various premises. They may all receive social profiles from cloud ambient service provider 140. It is understood that the same user may own or control multiple premises, and may interact with each one separately, using a single or multiple application(s) 131.

Continuing with reference to FIG. 1, in embodiments, each apparatus 120 may receive information regarding social profiles from cloud based service provider 140. The social profiles may profile the owner or user of the premises, as well as each visitor to the premises. In embodiments, visitors may be classified as "guests", and "strangers." "Guests" are generally persons socially known to the user, and with whom social visits may occur, such as relatives, business associates, friends, friends of family residing at the premise, and the like. "Strangers" may be of two types. In embodiments, a first type of stranger may include service providers such as postmen, plumbers, delivery men, etc., that may visit the premises on occasion, and are generally expected to arrive when they have business at the premise. In embodiments, other "strangers" may include persons unknown to the user, and any visit to the premise that they make, unexpected. Examples of unexpected strangers may be police investigators, salespeople, realtors canvassing a new area, process servers, and the like. As is described more fully below in connection with FIGS. 2A through 4, a different social profile may be created for "user", "guest" and "stranger." Additionally, in embodiments, a variation, or instantiation of each type may be created for each specific guest or stranger known to the system. Each type of visitor, and at a more granular level, each specific visitor, may be dealt with in the premise according to their specific social profile.

Cloud based service provider 140 may sometimes be referred to as a Cloud Ambient Service Provider, as shown in FIG. 1. Cloud based service provider 140 may be one or more hardware devices and/or one or more software modules that carry out the collection of data (including via API interfaces with social media and other cloud services), the creation of various user profiles, the communication with users and with apparatuses 120 in one or more premises, and the storage and application of user privacy settings to what information it directs be disclosed to visitors by an apparatus 120 in a premise. In embodiments, the one or more hardware devices may be tamper resistant and the operations may be carried out independent of processor(s) of a host/application platform. In embodiments where apparatus 140 is implemented as one or more software modules, the software modules may include "enclaves" which may be isolated regions of code and/or data within the memory of a computing platform.

Cloud based service provider 140 may include a social and user role profile knowledge base 142, a social interaction reference engine 143, a security and privacy management module 144 and a communication management module 145. Communication management module 145 may be one or more software modules that operate in conjunction with one or more hardware devices to configure communications circuitry (not shown) to communicate with one or more apparatuses 120, one or more users via application(s) 131 on a user device 130, and other cloud services 150 (e.g., Facebook™). Cloud based service provider may additionally be expanded to include other module(s), indicated as 141 in FIG. 1.

In embodiments, the social and user role profile knowledge base 142 may store all of the social profiles generated by cloud based service provider 140, as they may be updated. In embodiments, they may be updated based on each additional interaction in a premise, as well as using other information, such as by scouring/searching social media. Social and user role profile knowledge base 142 may also include general rules as to how different visitor situations are to be handled in a premise.

In embodiments, social interaction inference engine 143 may be configured to generate the social profiles that are stored in social and user role profile knowledge base 142. Social interaction inference engine 143 may do this in various ways. For a user profile, detailed information may be elicited from the user, including his or her preferences for visitor handling in a premise. It may also use various sources, such as Facebook™ and Twitter™ to create user profiles, and understand relationships between a user and his or her acquaintances and friends, such as how often a user meets with his or her contacts for meals, to attend sporting events together, or attend parties together. It may also track the social interactions of the user in the premise, such as how often the user hosts a given guest, for how long, and in what contexts. In embodiments, it may communicate with other cloud services 150, including social networks and other available sources by implementing application programming interface (APIs). To create social profiles, and to infer connections between a user and various persons, social interaction inference engine 143 considers the privacy settings of the user and other connected persons via security/privacy management module 144. In embodiments, the user may explicitly provide to cloud based service provider 140 what information and level of personal details may be disclosed to each type of visitor to the premise, as described below with reference to FIG. 2A. For example, for a generally expected stranger, such as a postman, whether or not to provide the visitor with the user's telephone number or other contact information, if requested or needed by the visitor. In embodiments, these details may be stored in security/privacy management module 144.

Finally, in embodiments, communication management module 145 of cloud based service provider 140 may handle communications between cloud based service provider 140 and each of apparatus 120, application(s) 131 running on a user device 130, and other cloud services 150.

Figure 2A:
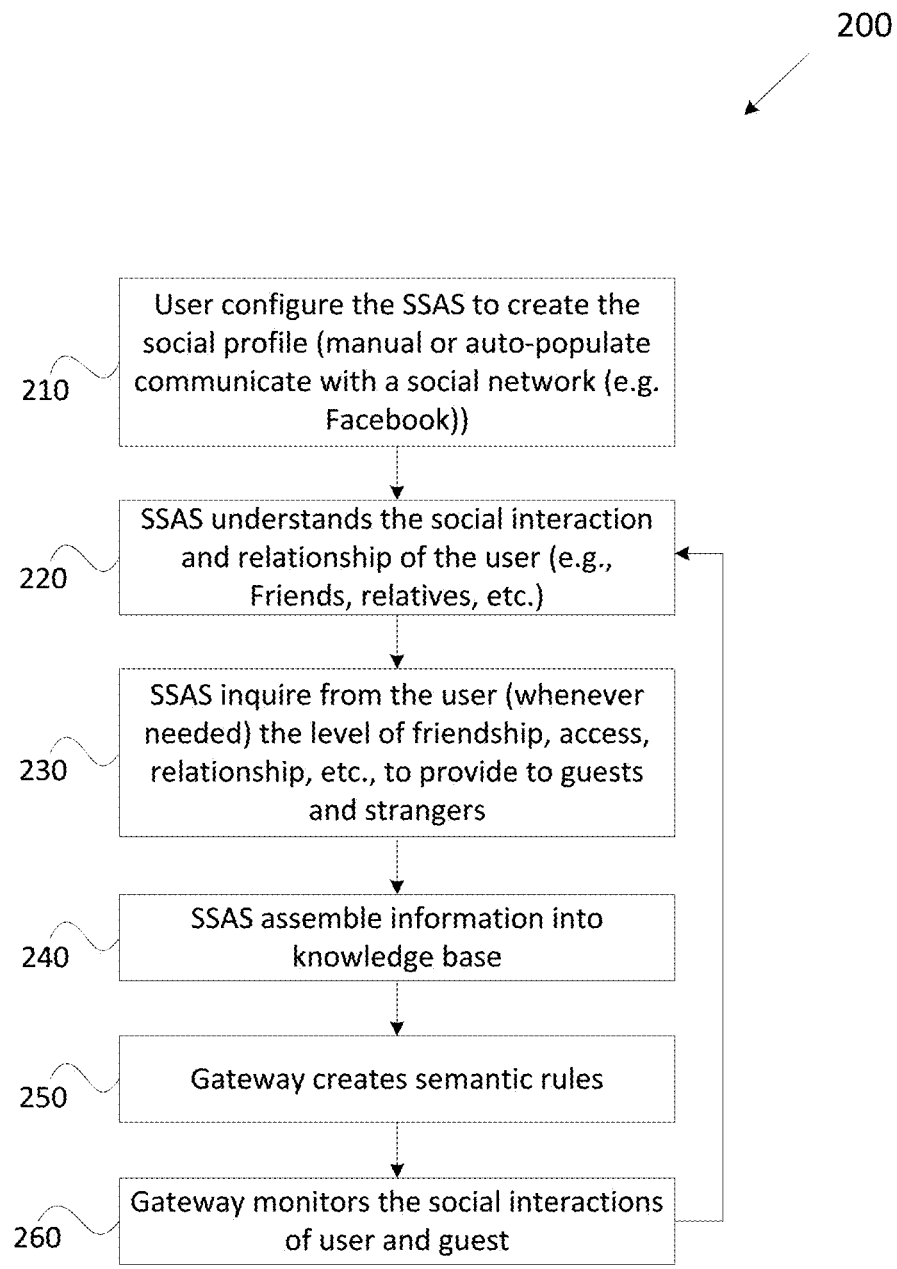
FIG. 2A illustrates an overview of the operational flow of a process for collection, configuration and assembly of a knowledge base, and the use of that knowledge base to create semantic rules, in accordance with various embodiments.

Referring now to FIG. 2A, an overview of operational flow for processes of creating a social and user profile knowledge base, and locally creating semantic rules for use in a premise are illustrated. As illustrated, processes 200 may include operations performed at blocks 210-240, and also at blocks 250-260. The operations at blocks 210-240 may be performed e.g., by the various elements of cloud based service provider 140, and the operations at blocks 250-260 may be performed e.g., by the various elements of apparatus 120, both earlier described with reference to FIG. 1. FIG. 2A refers to a "SSAS" which is a name used, in embodiments, referring to a "Smart Spaces Ambient Services" system, such as may be embodied or provided by cloud based service provider 140 shown in FIG. 1. FIG. 2A also refers to a "gateway", which is a name used, in embodiments, for a local apparatus such as 120 of FIG. 1.

Process 200 may begin at block 210. At block 210 a user may configure the system to create a "user" social profile. A user may do this manually, or may allow the system to access social media data, such as the user's Facebook account. At block 220 the system develops an understanding of the user's social network, and his or her relationship to each of the individuals within it. From block 220 process 200 may proceed to block 230, where the system may query the user as to how close a given potential visitor is to the user. I.e., the level of friendship, access, relationship, etc., to provide to guests and strangers in the premise. At block 240 the system may assemble the information it has now acquired into a knowledge base, such as social and user profile knowledge base 142 of FIG. 1.

Process 200 may move from block 240 to 250, which may then be performed locally in a premise, e.g., on apparatus 120 of FIG. 1. At block 250 a local ambient services apparatus may create semantic rules for handling the guests and strangers that may visit the premise. The process of block 250 may be based, at least in part, on the social profiles created in blocks 210-240, and stored, for example, in a cloud service provider (e.g., in social and user role profile knowledge base 142 of FIG. 1), and then received in a local gateway. Process 200 may then move to block 260, where a local apparatus may monitor the actual social interactions of users and guests in the premise. That monitoring data may be used to inform the process of block 220, and thereby further enhance the cloud based service provider's understanding of the relationship between a user and a visitor, which may be used to update a knowledge base.

Figure 2B:
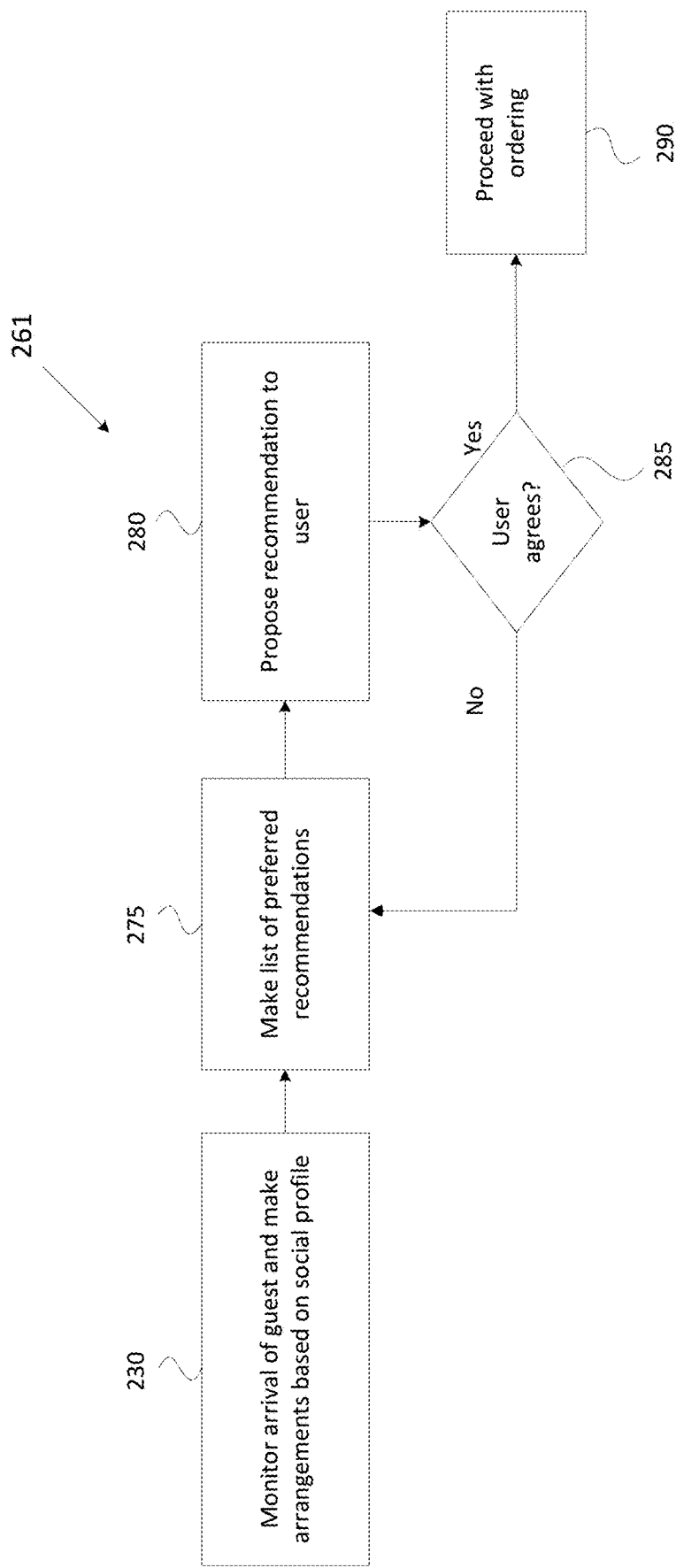
FIG. 2B illustrates an overview of the operational flow of a process for collection, configuration and assembly of a knowledge

Referring now to FIG. 2B, an overview of operational flow for a process of providing ambient service recommendations for a planned guest visit to a premise is illustrated. The recommendations may, in embodiments, be based on an analysis of the social profiles of both the user and the known guest. As illustrated, process 261 may include operations performed at blocks 270-290. Process 261 may, in some embodiments, be performed by cloud based service provider 140, or, in other embodiments, may be performed by the various elements of apparatus 120, both earlier described with reference to FIG. 1.

Process 261 may begin at block 270. At block 270, an event of a guest arrival to the premise may be monitored, and arrangements generated for food or other amenities based on the social profiles of the guest and/or the user. From block 270 process 261 may proceed to block 275, where a list of preferred recommendations for implementing the arrangements generated in block 270 may be created. The preferred recommendations may include a preferred store or restaurant to order food or food service from, including preferred ingredients and specific choices (e.g., a preferred wine, a preferred meal, a preferred type of vegetables or desert, etc.). Additionally, preferred recommendations for the guest may, in embodiments, include a particular gift to be presented to the guest, a preferred store to obtain it from, and which brands of the item are acceptable. From block 275 process 261 may proceed to block 280, where the preferred recommendations created in block 275 may be presented to a user (e.g., by communicating with the user via user device 130, through an ambient service application 131). From block 280 process 261 may proceed to block 285, where it may be determined if the user agrees with the preferred recommendations created at block 275. If Yes, process 261 may proceed to block 290, where cloud ambient service provider 140, or, as the case may be, apparatus 120, may proceed with ordering the food, ingredients, gifts, etc. that are on the list of preferred recommendations. In embodiments, food, gifts and other items may be ordered from online sellers, such as Amazon™, or the like, via an application programming interface or API. If, on the other hand, the result of query block 285 is No, then process 261 may proceed to block 275, and a revised list of preferred recommendations may be generated. Process 261 may iteratively proceed in several loops through blocks 285, 275 and 280, until such time as the user agrees with a list of preferred recommendations at block 285, and process 261 may proceed to block 290. At block 290 process 261 may terminate.

An example of the process of FIG. 2B may involve a planned visit to a premise where a user lives by the user's uncle. In this example the process of FIG. 2B may be performed locally, in a premise, by an apparatus such as apparatus 120. The uncle has a previously created social profile stored in apparatus 120, in particular, in social profile engine 125. The profile may be a particular version of a standard "guest" profile for the user/owner of the premise in which apparatus 120 is provided, as noted above. Based on previous visits, local inference engine 123 may determine, prior to the uncle's visit, that pizza and beer should be ordered from a local restaurant, to be delivered at the time of the visit, and may generate a list of recommendations for the uncle's visit. The list may also include a gift for the uncle, based on his social profile noting that he loves Star Wars movies. The recommended gift may be the latest movie in the Star Wars franchise, that has just been released for purchase online, as a digital copy. This particular recommendation may be due to the fact that Social and User Role Profile Knowledge Base 141, within Cloud Ambient Service Provider 140 of FIG. 1, may have recently updated the uncle's social profile, based on a recent Facebook post of this uncle, commenting how much he wanted to have the movie when it is released. Once the recommendation list is generated, it may be sent to the user, via communications management module 127, to user device 130, and appear as a message in an application 131. The user may, for example, approve the pizza and beer recommendation, as well as the gift, but specify that the order be placed with the local high-end pizzeria, "Vince's Pizza." Once apparatus 120 receives the user's approval with the specific restaurant to order from, Communication Management Module 127 may, as a result, communicate over the Internet or a telephone line to the local restaurant to place the order in advance. At a scheduled time of the visit, the uncle may ring the doorbell at a front door of the premise. There may be a Camera 113 that captures images of whoever stands in front of Door 111, as well as a microphone and speaker. Because Door 111, Camera 113 and microphone/speaker may each be connected to apparatus 120, Communications Management Module 127 may process images of the face of the uncle as he stands in front of Door 111. Because the uncle's social profile contains his photograph, Communications Management Module 127 may perform facial recognition on the images acquired by Camera 113 and recognize that it is the expected uncle. Alternatively, as described below in connection with FIG. 3, other processes may be used instead of, or in conjunction with, facial recognition or other visual analytics based processing of the images obtained by Camera 113, such as cell phone IMEI. Upon determining that the visitor is in fact the expected uncle, Communications Management Module 127 may signal Door 111 to open, by causing communications circuitry 129 to send a control signal to Door 111 using one of various wireless protocols that communications circuitry 129 uses to communicate with the peripherals. Communications Management Module 127 may also send an audio signal, via communications circuitry 129, welcoming the uncle to the premise, and advising him to proceed to the living room where the visit will take place. If the user is not yet at home, Communications Management Module 127 may contact the user via text, telephone or email, advising that the guest has arrived.

Similar interactions with unexpected gusts, as well as recognized strangers and unrecognized strangers may be performed, as is next described in connection with FIGS. 3 and 4.

Figure 3:
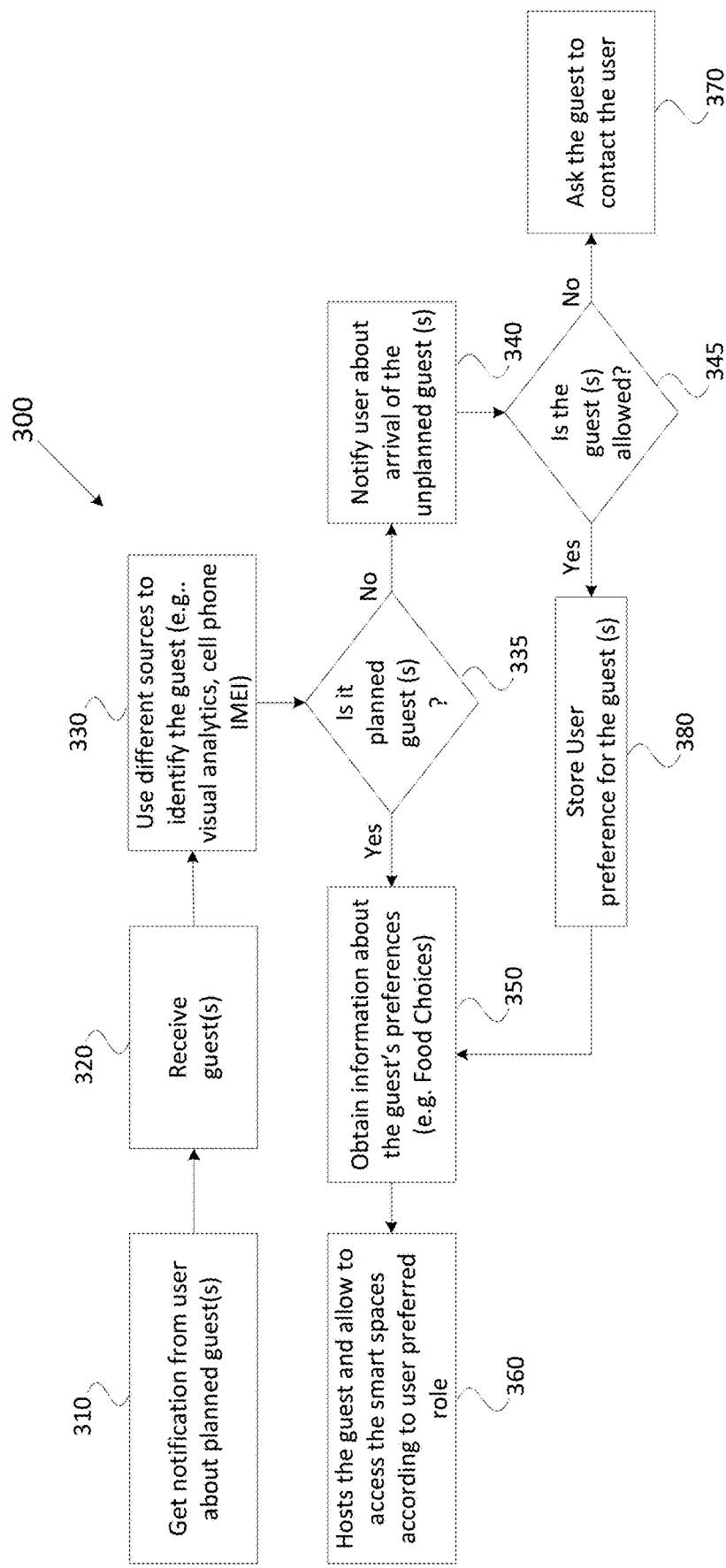
FIG. 3 illustrates an overview of the operational flow of a process for identification of and/or hosting a guest in the premise, in accordance with various embodiments.
Figure 4:
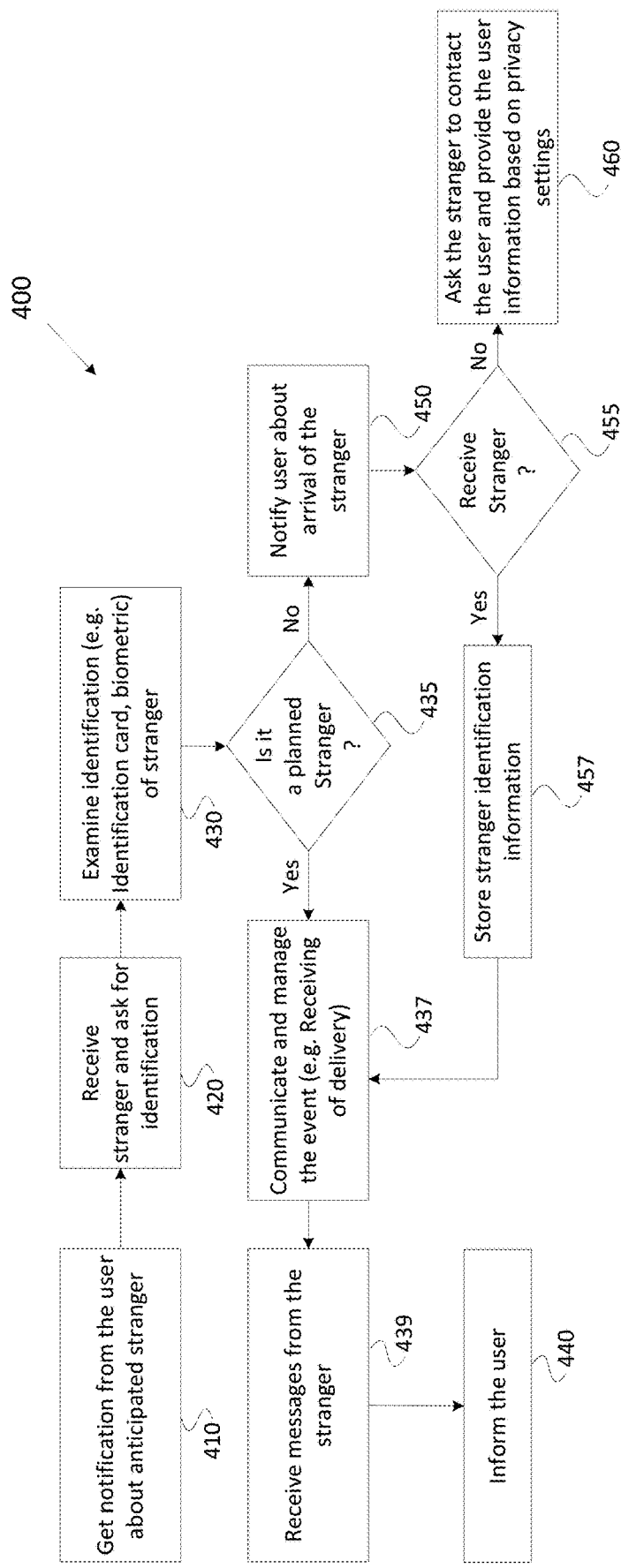
FIG. 4 illustrates an overview of the operational flow of a process for identification of and hosting of a stranger in the premise, in accordance with various embodiments.

Referring now to FIGS. 3 and 4, overviews of operational flow for processes of providing ambient service for visitors to a premise, involving two types of visitors, namely a guest and an anticipated stranger, respectively, are illustrated.

As illustrated, process 300 may include operations performed at blocks 310-370. The operations may be performed e.g., by the various elements of apparatus 120 earlier described with reference to FIG. 1. In embodiments, process 300 addresses dealing with a guest who visits a premise.

Process 300 may begin at block 310. At block 310, notification about a planned guest may be received. From block 310 process 300 may proceed to block 320, where guests may be received in a premise. From block 320 process 300 may proceed to block 330, where different sources to identify the guest (e.g., visual analytics, cell phone International Mobile Equipment Identity).

From block 333, process 300 may proceed to block 335, where it may be determined if the guest appearing at the premise is in fact the expected panned guest. If Yes, process 300 may proceed to block 350, where information may be obtained about the guest's preferences. From block 350, process 300 may proceed to block 360, where it may welcome the guest into the premise and manage the visit according to the user's preferences for that guest, or, alternatively, for that general category of guest, depending upon the level of detail known. If, on the other hand, the result of query block 335 is No, then process 300 may proceed to block 340, the user may be notified that an unplanned guest arrival has occurred. From block 340, process 300 may proceed to block 345, where it may be determined if the user allows the unplanned guest to visit nonetheless. If Yes, then process 300 may proceed to block 380, where the user's preference for dealing with this guest may be stored (in embodiments, such preference may be obtained from the user at block 345, when the user responds as to whether to invite in to the premise this unplanned guest). From block 380 process 300 may proceed to blocks 350 and 360, described above. Alternatively, if No at block 345, and the guest is not allowed into the premise, process 300 may proceed to block 370, where the guest may be requested to contact the user. At block 370 process 300 may terminate.

As illustrated, process 400 may include operations performed at blocks 410-460. The operations may be performed e.g., by the various elements of apparatus 120 earlier described with reference to FIG. 1. In embodiments, process 400 addresses dealing with a stranger who visits a premise.

Process 400 may begin at block 410. At block 410, notification about an anticipated stranger may be received form a user. From block 410 process 400 may proceed to block 420, where the stranger may be received in a premise and asked for identification. From block 420 process 400 may proceed to block 430, where the proffered identification information of the stranger may be examined. In embodiments this identity information may include an identification card, a passport, various biometrics, or the like.

From block 430, process 400 may proceed to block 435, where it may be determined if the stranger's visit was planned. If Yes, process 400 may proceed to block 437, where communication with the stranger may ensue, and the event or purpose of the stranger's visit managed. For example, the stranger may be a delivery person, and the package or parcel he or she has delivered may be received. From block 437, process 400 may proceed to block 439, where any message from the stranger may be received, and from block 439, process 400 may proceed to block 440, where the user may be informed about the stranger's visit and any messages he or she has provided, and the process may then terminate.

On the other hand, If No at block 435, then from block 435, process 400 may proceed to block 450, where the user may be notified that an unplanned stranger has arrived. From block 450, process 400 may proceed to block 455, where it may be determined if the user allows the unplanned stranger guest to be received nonetheless. If Yes, then process 400 may proceed to block 457, where the stranger's identification information (which may have been obtained in block 430, described above) may be stored. From block 457 process 400 may proceed to blocks 437, 439 and 440, described above for the case of a planned stranger's visit to the premise. Alternatively, if the result is No at block 455, and the unplanned stranger is not allowed into the premise, process 400 may proceed to block 460, where the guest may be requested to contact the user and provide the user with further information, based at least in part, on privacy settings for the user. I.e., the user may require a certain level of disclosure form an unplanned stranger prior to allowing that stranger's entry to the premise. At block 460 process 400 may terminate.

An example of aspects of the process shown in FIG. 4, for a planned stranger, may include an expected delivery person from a pizzeria. Continuing the example of an uncle's visit to a premise, as described above, prior to the planned arrival of the uncle, pizza and beer were ordered by Communications Management Module 127 of apparatus 120 of FIG. 1. The person delivering these foods may be a planned type of stranger as is illustrated in FIG. 4. Communications Management Module 127, having ordered the pizza and beer, anticipated his or her arrival at the premise within a certain time window. The delivery person may thus arrive at a door of the premise, and, as in the example above, be asked for identification by a voice or text message sent from Communications Management Module 127 to a speaker or display provided near a door to the premise. A camera at the door, such as Camera 113 in FIG. 1, may acquire images of the identification presented, such as that of an identification card, or a voice, eye, face, or other biometrically recognizable anatomical part. Based on an analysis of the proffered identification, Communications Management Module 127 may identify the stranger, and may open the door to the premise by sending a signal, through communications circuitry 129, over a link 110 to Door 111. Communications Management Module 127 may also instruct, via a voice message sent to a speaker near Door 111 the delivery person as to where to place the pizza and beer. Finally, Communications Management Module 127 may view images of the premise, including both the interior rooms and Door 111 to verify that the delivery person has left the premise. It is understood that various other interactions with both planned as well as unplanned strangers and guests may be performed at a premise by apparatus 120, acting through one or more peripherals 111-114, under the control of Communications Management Module 127, based at least in part on decisions and determinations made by Local Inference Engine 123, themselves based at least in part on social profiles stored in Social Profile Engine 125. As noted, in each such case, Communications Management Module 127 may send data and control signals, as well as receive data signals, from peripherals 111-114, via communications circuitry or modem 129, using one or more communications protocols 110.

Figure 5:
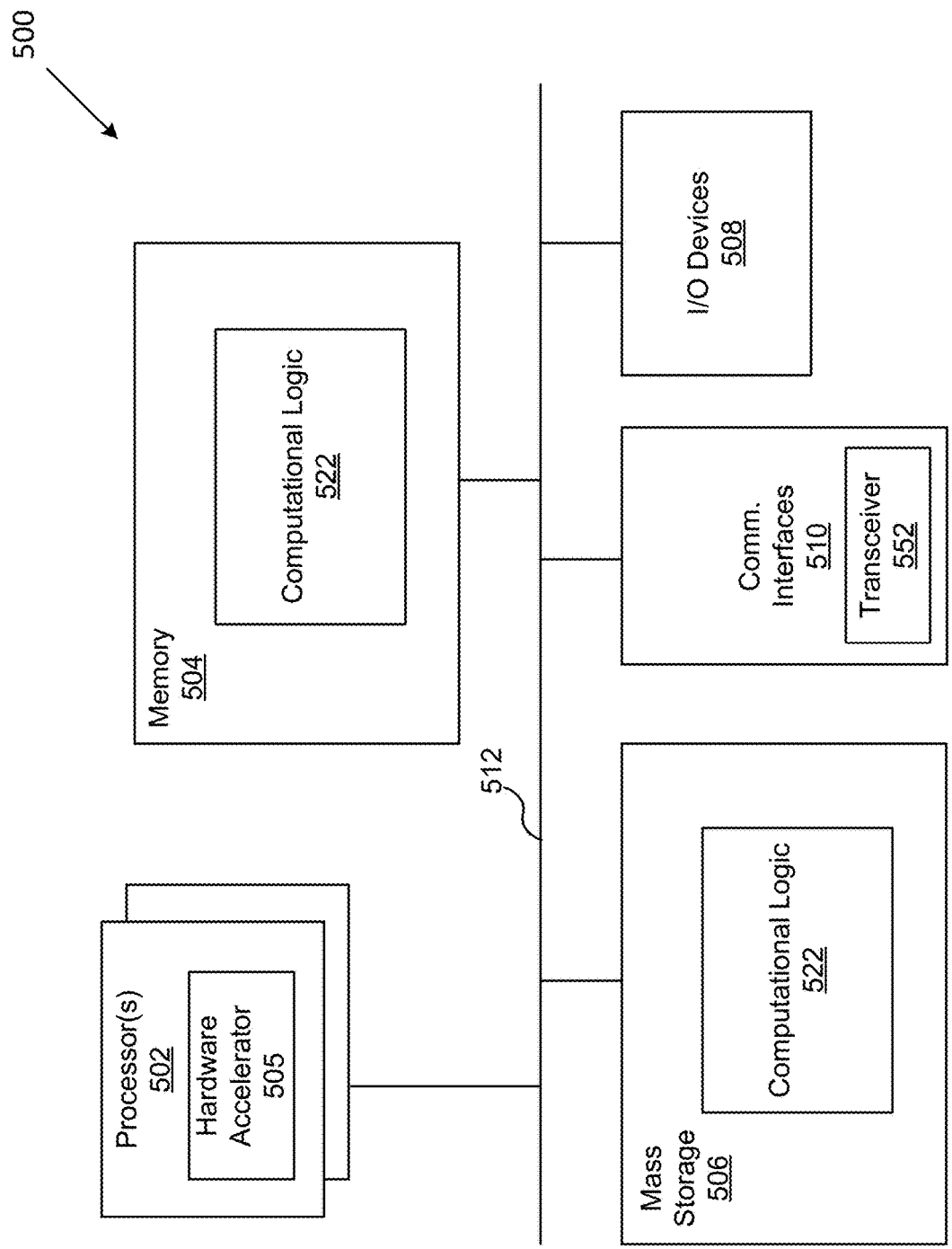
FIG. 5 illustrates a block diagram of a computer device suitable for practicing the present disclosure, in accordance with various embodiments.

Referring now to FIG. 5, wherein a block diagram of a computer device suitable for practicing the present disclosure, in accordance with various embodiments, is illustrated. As shown, computer device 500 may include one or more processors 502, memory controller 503, and system memory 504. Each processor 502 may include one or more processor cores and/or hardware accelerator 505. An example of hardware accelerator 505 may include, but is not limited to, programmed field programmable gate arrays (FPGA). Memory controller 503 may be any one of a number of memory controllers known in the art. System memory 504 may include any known volatile or non-volatile memory.

Additionally, computer device 500 may include mass storage device(s) 506 (such as solid state drives), input/output device interface 508 (to interface with various input/output devices, such as, mouse, cursor control, display device (including touch sensitive screen), and so forth) and communication interfaces 510 (such as network interface cards, modems and so forth). In embodiments, communication interfaces 510 may support wired or wireless communication, including near field communication. The elements may be coupled to each other via system bus 512, which may represent one or more buses. In the case of multiple buses, they may be bridged by one or more bus bridges (not shown).

Each of these elements may perform its conventional functions known in the art. In particular, system memory 504 and mass storage device(s) 506 may be employed to store a working copy and a permanent copy of the executable code of the programming instructions of an operating system, one or more application, local inference engine 123, social profile engine 125, communication management module 127, social interaction inference engine 143, security/privacy management 144, and/or communication management module 145, collectively referred to as computing logic 522. Local inference engine 123 et al. may be configured to practice (aspects of) processes 200, 300 and 400 of FIGS. 2-4, respectively. The programming instructions may comprise assembler instructions supported by processor(s) 502 or high-level languages, such as, for example, C, that can be compiled into such instructions. In embodiments, some of computing logic may be implemented in hardware accelerator 505.

The permanent copy of the executable code of the programming instructions or the bit streams for configuring hardware accelerator 505 may be placed into permanent mass storage device(s) 506 in the factory, or in the field, through, for example, a distribution medium (not shown), such as a compact disc (CD), or through communication interface 510 (from a distribution server (not shown)).

The number, capability and/or capacity of these elements 510-512 may vary, depending on the intended use of example computer device 500, e.g., whether example computer device 500 is a smartphone, tablet, ultrabook, a laptop, a server, a set-top box, a game console, a camera, and so forth. The constitutions of these elements 510-512 are otherwise known, and accordingly will not be further described.

Figure 6:
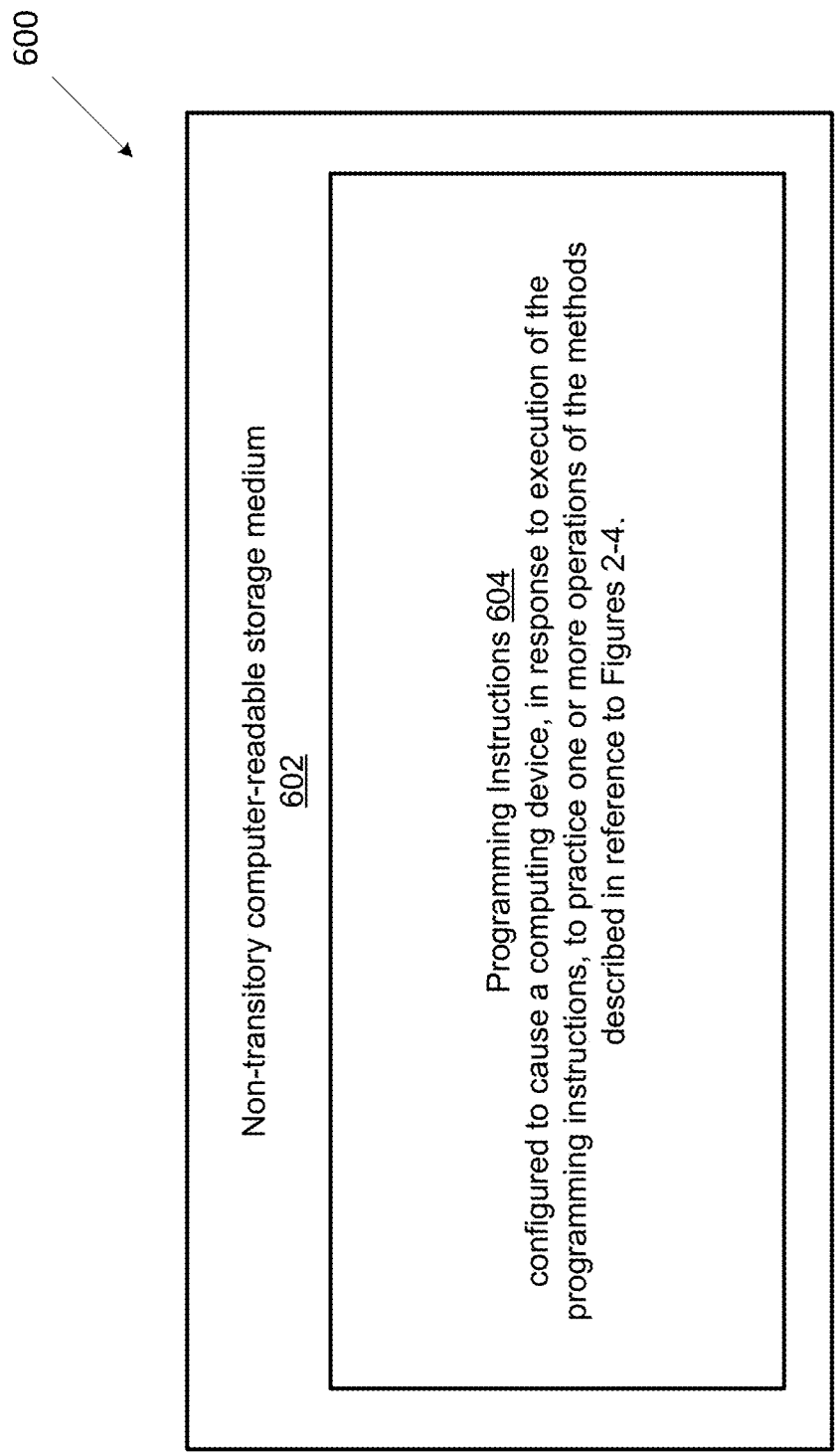
FIG. 6 illustrates an example computer-readable storage medium having instructions configured to practice aspects of the processes of FIGS. 2-4, in accordance with various embodiments.

FIG. 6 illustrates an example computer-readable storage medium having instructions configured to implement all (or portion of) local inference engine 123, social profile engine 125, communication management module 127, social interaction inference engine 143, security/privacy management 144, and/or communication management module 145, and/or practice (aspects of) processes 200, 300 and 400 of FIGS. 2-4, respectively, earlier described, in accordance with various embodiments. As illustrated, computer-readable storage medium 602 may include the executable code of a number of programming instructions or bit streams 604. Executable code of programming instructions (or bit streams) 604 may be configured to enable a device, e.g., computer device 500, in response to execution of the executable code/programming instructions (or operation of an encoded hardware accelerator 505), to perform (aspects of) processes 200, 300 and 400 of FIGS. 2-4, respectively. In alternate embodiments, executable code/programming instructions/bit streams 604 may be disposed on multiple non-transitory computer-readable storage medium 602 instead. In embodiments, computer-readable storage medium 602 may be non-transitory. In still other embodiments, executable code/programming instructions 604 may be encoded in transitory computer readable medium, such as signals.

Referring back to FIG. 5, for one embodiment, at least one of processors 502 may be packaged together with a computer-readable storage medium having some or all of computing logic 522 (in lieu of storing in system memory 504 and/or mass storage device 506) configured to practice all or selected ones of the operations earlier described with references to FIGS. 2-4. For one embodiment, at least one of processors 502 may be packaged together with a computer-readable storage medium having some or all of computing logic 522 to form a System in Package (SiP). For one embodiment, at least one of processors 502 may be integrated on the same die with a computer-readable storage medium having some or all of computing logic 522. For one embodiment, at least one of processors 502 may be packaged together with a computer-readable storage medium having some or all of computing logic 522 to form a System on Chip (SoC). For at least one embodiment, the SoC may be utilized in, e.g., but not limited to, a hybrid computing tablet/laptop.

Illustrative examples of the technologies disclosed herein are provided below. An embodiment of the technologies may include any one or more, and any combination of, the examples described below.

Example 1 may include an apparatus for providing on premise ambient service, comprising a profile engine to interact with a cloud ambient service provider to receive at least one of a profile of a user of a premise or a profile of one or more visitors of the premise, wherein the profiles are associated with the provision of ambient service to a visitor of the premise on behalf of the user; and a management module coupled to the profile engine to interact with one or more peripherals at the premise to provide ambient service to one or more visitors of the premise, on behalf of the user, based at least in part on the user or visitor profile; wherein the apparatus is disposed at the premise.

Example 2 may include the apparatus of example 1 and/or some other examples herein, wherein the visitors include known guests and strangers, and the user profile contains service preferences of the user for guests and for strangers.

Example 3 may include the apparatus of examples 1 or 2 and/or some other examples herein, wherein the management module is to identify a visitor to the premise upon arrival.

Example 4 may include the apparatus of example 3 and/or some other examples herein, wherein the management module is to identify a visitor based on data associated with interaction with the visitor at the premise, including at least one of visual analytic data or cell International Mobile Equipment Identity.

Example 5 may include the apparatus of examples 1 or 2, and/or some other examples herein, further comprising an inference engine, coupled to the profile engine and to the management module, to generate ambient service instructions for the premise based at least in part on one or more of the user profile, a group visitor profile, an individual visitor profile, and data associated with interaction between the management module or the user and one or more visitors at the premise.

Example 6 may include the apparatus of example 5 and/or some other examples herein, wherein a group visitor profile is for one of a guest, a recognized stranger, or an unknown stranger, and wherein an individual visitor profile is for a specific individual.

Example 7 may include the apparatus of examples 1 or 2, and/or some other examples herein, wherein the profile engine is to communicate with the cloud ambient service provider through backhaul communication, and the management engine is to communicate with the one or more peripherals through fronthaul communication.

Example 8 may include the apparatus of examples 1 or 2, and/or some other examples herein, wherein the management module is to monitor interactions of a user with a visitor in the premise and store information regarding the interactions in the profile engine.

Example 9 may include the apparatus of example 8 and/or some other examples herein, wherein the profile engine is to further transmit the information regarding the interactions of a user with a visitor to the cloud service provider.

Example 10 may include the apparatus of example 5 and/or some other examples herein, wherein the inference engine is to further generate ambient service recommendations for the user's approval in advance of a planned guest's arrival.

Example 11 may include the apparatus of example 10 and/or some other examples herein, wherein the ambient service recommendations include one or more of food or gifts to order, stores or online services from which to order, brands and ingredients of food items, or brands and quality level of gifts to obtain.

Example 12 may include the apparatus of examples 10 or 11, and/or some other examples herein, wherein, upon user approval of the ambient services recommendations, the inference engine is to direct the management module to implement the preferred ambient services recommendations.

Example 13 may include the apparatus of examples 1 or 2, and/or some other examples herein, wherein the peripherals include one or more of a gate, a door, a mailbox, a camera, a lamp, a light, an entertainment system, a food service device, a visitor communication device, and a user communication device.

Example 14 may include the apparatus of examples 1 or 2, and/or some other examples herein, wherein following a visit by a visitor to the premise, the management module is to further send data to the cloud ambient service provider to update the user profile or a visitor profile.

Example 15 may include a method to be performed by a computer device providing on premise ambient service, comprising: obtaining or receiving, by the computer device, from a cloud ambient service provider, at least one of a profile of a user of a premise or a profile of one or more visitors of the premise, wherein the profiles are associated with provision of ambient service to a visitor of the premise on behalf of the user; and interacting, by the computer device, with peripherals at a premise to provide ambient service to one or more visitors of the premise, on behalf of the user, based at least in part on the at least one user or visitor profile.

Example 16 may include the method of example 15, and/or some other examples herein, wherein the visitors include known guests and strangers, and the user profile contains service preferences of the user.

Example 17 may include the method of example 15, and/or some other examples herein, wherein the visitors include known guests and strangers, and the user profile contains service preferences of the user.

Example 18 may include the method of examples 15-17, and/or some other examples herein, further comprising generating, by the computer device, real-time ambient service decisions based at least in part on one or more of the user profile, a group visitor profile, an individual visitor profile, and data associated with interaction between the computer device or the user and one or more visitors at the premise.

Example 18 may include the method of examples 15-17, and/or some other examples herein, further comprising generating, by the computer device, real-time ambient service decisions based at least in part on one or more of the user profile, a group visitor profile, an individual visitor profile, and data associated with interaction between the computer device or the user and one or more visitors at the premise.

Example 19 may include the method of examples 15-17, and/or some other examples herein, further comprising monitoring, by the computer device, interactions of a user with a visitor in the premise, and storing information regarding the interactions in the computer device.

Example 20 may include the method of example 15, and/or some other examples herein, wherein the visitors include known guests and strangers, and the user profile contains service preferences of the user.

Example 21 may include a computing device to provide ambient service data to apparatuses that provide ambient service in a premise, comprising: a management module to obtain information on users and visitors of a premise; an interaction inference module comprising a hardware accelerator to create profiles for the users and visitors, based at least in part on the information; and a profile database to store the profiles and receive updates to the stored profiles.

Example 22 may include the computing device of example 21, and/or some other examples herein, wherein the management module is to crawl or search for information on the users and visitors from various online sources, including social media.

Example 23 may include the computing device of example 21, and/or some other examples herein, wherein the interaction inference module is to initially obtain user preferences for dealing with a visitor in the premise, and the hardware accelerator is to create, based on the user preferences and the information obtained by the communications module, the profiles.

Example 24 may include the computing device of examples 21-23, and/or some other examples herein, wherein the communications module is to send the profiles to an apparatus that provides ambient service in the premise.

Example 25 may include the computing device of examples 21-23, and/or some other examples herein, wherein the profiles include data regarding the actuation of various peripherals in the premise in various interactions between a user and a visitor in the premise.

Example 26 may include one or more non-transitory computer-readable storage media comprising a plurality of instructions that in response to being executed cause a computing device to: obtain, by the computing device, a profile of a user of a premise or a profile of one or more visitors of the premise, wherein the profiles are associated with provision of ambient service to a visitor of the premise on behalf of the user; interact with one or more peripherals at the premise to provide ambient service to one or more visitors of the premise, on behalf of the user, based at least in part on the at least one user or visitor profile.

Example 27 may include one or more non-transitory computer-readable storage media of example 26, and/or some other examples herein, wherein the visitors include known guests and strangers, and the user profile contains service preferences of the user for guests and for strangers.

Example 28 may include one or more non-transitory computer-readable storage media of examples 26 or 27, and/or some other examples herein, wherein the plurality of instructions, in response to being executed further cause the computing device to identify a visitor to the premise upon arrival.

Example 29 may include one or more non-transitory computer-readable storage media of example 28, and/or some other examples herein, wherein identify a visitor is based on data associated with interaction with the visitor at the premise, including at least one of visual analytic data, biometric data or cell International Mobile Equipment Identity.

Example 30 may include one or more non-transitory computer-readable storage media of examples 26 or 27, and/or some other examples herein, wherein the plurality of instructions, in response to being executed further cause the computing device to generate ambient service instructions for the premise based at least in part on one or more of the user profile, a group visitor profile, an individual visitor profile, and data associated with interaction between the management module or the user and one or more visitors at the premise.

Example 31 may include one or more non-transitory computer-readable storage media of example 30, and/or some other examples herein, wherein a group visitor profile is for one of a guest, a recognized stranger, or an unknown stranger, and wherein an individual visitor profile is for a specific individual.

Example 32 may include one or more non-transitory computer-readable storage media of examples 26 or 27, and/or some other examples herein, wherein the plurality of instructions, in response to being executed further cause the computing device to communicate with the cloud ambient service provider through backhaul communication, and to communicate with the one or more peripherals through fronthaul communication.

Example 33 may include one or more non-transitory computer-readable storage media of examples 26 or 27, and/or some other examples herein, wherein the plurality of instructions, in response to being executed further cause the computing device to monitor interactions of a user with a visitor in the premise and store information regarding the interactions in the profile engine.

Example 34 may include one or more non-transitory computer-readable storage media of example 33, and/or some other examples herein, wherein the plurality of instructions, in response to being executed further cause the computing device to further transmit the information regarding the interactions of a user with a visitor to the cloud service provider.

Example 35 may include one or more non-transitory computer-readable storage media of examples 34, and/or some other examples herein, wherein the plurality of instructions, in response to being executed further cause the computing device to further generate ambient service recommendations for the user's approval in advance of a planned guest's arrival.

Example 36 may include one or more non-transitory computer-readable storage media of example 30, and/or some other examples herein, wherein the ambient service recommendations include one or more of food or gifts to order, stores or online services from which to order, brands and ingredients of food items, or brands and quality level of gifts to obtain.

Example 37 may include one or more non-transitory computer-readable storage media of examples 35 or 36, and/or some other examples herein, wherein upon user approval of the ambient services recommendations, wherein the plurality of instructions, in response to being executed further cause the computing device to direct the management module to implement the preferred ambient services recommendations.

Example 38 may include one or more non-transitory computer-readable storage media of examples 26 or 27, and/or some other examples herein, wherein the peripherals include one or more of a gate, a door, a mailbox, a camera, a lamp, a light, an entertainment system, a food service device, a visitor communication device, and a user communication device.

Example 39 may include one or more non-transitory computer-readable storage media of examples 26 or 27, and/or some other examples herein, wherein following a visit by a visitor to the premise, the management module is to further send data to the cloud ambient service provider to update the user profile or a visitor profile.

Example 40 may include an apparatus for computing provided in a premise, comprising: means for interacting with a cloud ambient service provider to receive at least one of a profile of a user of a premise or a profile of one or more visitors of the premise, wherein the profiles are associated with provision of ambient service to a visitor of the premise on behalf of the user; and means for interacting with one or more peripherals at the premise to provide ambient service to one or more visitors of the premise, on behalf of the user, based at least in part on the at least one user or visitor profile.

Example 41 may include the apparatus for computing of example 40, and/or some other examples herein, wherein the visitors include known guests and strangers, and the user profile contains service preferences of the user for guests and for strangers.

Example 42 may include the apparatus for computing of examples 40 or 41, and/or some other examples herein, wherein the means for interacting with one or more peripherals is to identify a visitor to the premise upon arrival.

Example 43 may include the apparatus for computing of example 41, and/or some other examples herein, wherein identify a visitor includes identifying the visitor based on data associated with interaction with the visitor at the premise, including at least one of visual analytic data, biometric data or cell International Mobile Equipment Identity.

Example 44 may include the apparatus for computing of examples 40 or 41, and/or some other examples herein, further comprising means to generate ambient service instructions for the premise, coupled to the means for means for interacting with one or more peripherals, the instructions based at least in part on one or more of the user profile, a group visitor profile, an individual visitor profile, and data associated with interaction between either the user or the means for interacting with one or more peripherals, and one or more visitors at the premise.

Example 45 may include the apparatus for computing of example 44, and/or some other examples herein, wherein a group visitor profile is for one of a guest, a recognized stranger, or an unknown stranger, and wherein an individual visitor profile is for a specific individual.

Example 46 may include the apparatus for computing of examples 40 or 41, and/or some other examples herein, wherein further comprising a storage means, coupled to the means for interacting with one or more peripherals, wherein the means for interacting with one or more peripherals is to: monitor interactions of a user with a visitor in the premise, store information regarding the interactions in the storage means, and transmit the information regarding the interactions to the cloud ambient service provider.

Example 47 may include the apparatus for computing of example 44, and/or some other examples herein, wherein the means to generate ambient service instructions is to further generate ambient service recommendations for the user's approval in advance of a planned guest's arrival.

Example 48 may include the apparatus for computing of example 47, and/or some other examples herein, wherein the ambient service recommendations include one or more of food or gifts to order, stores or online services from which to order, brands and ingredients of food items, or brands and quality level of gifts to obtain.

Example 49 may include the apparatus for computing of example 48, and/or some other examples herein, wherein upon user approval of the ambient services recommendations, the means to generate ambient service instructions is to further direct the means for interacting with one or more peripherals to implement the preferred ambient services recommendations.

Example 50 may include the apparatus for computing of examples 40 or 41, and/or some other examples herein, wherein the means for interacting with one or more peripherals is to further send data to the cloud ambient service provider to update the user profile or a visitor profile, following a visit by a visitor to the premise.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus to be employed as an ambient services gateway disposed at a premises, the apparatus comprising:

a profile engine arranged to interact with a cloud ambient service provider, the profile engine is to receive at least one social profile, the at least one social profile being a profile of a user of the premises, wherein the at least one social profile is associated with provision of ambient service to the user, wherein the user of the premises is an owner of the premises or a visitor to the premises;

a management module coupled to the profile engine, the management module is arranged to control transmission of control signaling to one or more peripheral devices at the premises to instruct the one or more peripheral devices to provide an ambient service to the user based at least in part on ambient service instructions; and an inference engine, coupled to the profile engine and the management module, the inference engine is arranged to generate the ambient service instructions for providing the ambient service to the user based at least in part on the at least one social profile and data pertaining to interactions between the management module or the user and one or more other persons at the premises wherein the one or more other persons are owners of the premises or visitors to the premises.

2. The apparatus of claim 1, wherein, when the user is a visitor to the premises, the user profile is to include service preferences of the user for guests and for strangers.

3. The apparatus of claim 1, wherein the management module is arranged to identify the user upon arrival to the premises.

4. The apparatus of claim 3, wherein the management module is arranged to identify the user based on data associated with interaction with at least one of the one or more peripheral devices, including at least one of visual analytic data or cell International Mobile Equipment Identity.

5. The apparatus of claim 1, wherein the social profile of the user is a social profile for one of a guest, a recognized stranger, or an unknown stranger.

6. The apparatus of claim 1, wherein:
the profile engine is arranged to control a communication interface to communicate with the cloud ambient service provider through a first communication link, and
the management module is arranged to control the communication interface to communicate with the one or more peripheral devices through respective second communication links, wherein the second communication links are different than the first communication link.

7. The apparatus of claim 1, wherein the management module is arranged to monitor interactions of the user with one or more other devices at the premises, and store information regarding the interactions for later use by the profile engine.

8. The apparatus of claim 7, wherein the profile engine is arranged to control a communication interface to transmit the information regarding the interactions to the cloud ambient service provider.

9. The apparatus of claim 1, wherein the inference engine is arranged to further generate ambient service recommendations for the user's approval in advance of arrival of other users.

10. The apparatus of claim 9, wherein the ambient service recommendations include one or more of food or gifts to order, stores or online services from which to order, brands and ingredients of food items, or brands and quality level of gifts to obtain.

11. The apparatus of claim 10, wherein, upon user approval of the ambient services recommendations, the inference engine is arranged to direct the management module to implement the preferred ambient services recommendations.

12. The apparatus of claim 1, wherein the one or more peripheral devices include one or more of a gate, a door, a mailbox, a camera, a lamp, a light, an entertainment system, a food service device, a visitor communication device, and a user communication device.

13. The apparatus of claim 1, wherein, following a visit by the visitor to the premises, the management module is arranged to control a communication interface to send data to the cloud ambient service provider to update the social profile.

14. The apparatus of claim 1, wherein the one or more peripheral devices include one or more of one or more sensors, one or more actuators, one or more switches, one or more Internet of Things (IoT) devices, and one or more machine-type communication (MTC) devices.

15. A method to be performed by an ambient services gateway providing on premises ambient services, the method comprising:
obtaining or receiving, by the ambient services gateway from a cloud ambient service provider, at least one social profile of a user of a premises, wherein the at least one social profile of the user is associated with provision of ambient services to the user, wherein the user of the premises is an owner of the premises or a visitor to the premises;
generating, by the ambient services gateway, ambient service instructions for providing the ambient services to the user based at least in part on the at least one social profile and data associated with interactions between a computing device or the user and one or more other persons observed at the premises, wherein the one or more other persons are owners of the premises or visitors to the premises; and
transmitting, by the ambient services gateway, the ambient service instructions to one or more peripheral devices at the premises, the ambient service instructions for instructing the one or more peripheral devices to provide the ambient services to the user based at least in part on ambient service instructions.

16. The method of claim 15, further comprising:
identifying, by the ambient services gateway, one or more other users based on data associated with interactions with the user at the premises including at least one of visual analytic data or cell International Mobile Equipment Identity.

17. The method of claim 15, further comprising:
generating, by the ambient services gateway, real-time ambient service decisions based at least in part on the at least one social profile of the user and based on data associated with interactions between the computing device or the user and one or more other users at the premises.

18. The method of claim 15, further comprising:
monitoring, by the ambient services gateway, interactions of the user with one or more other users at the premises; and
transmitting, by the ambient services gateway, updated user profile data or user interaction data to the cloud ambient service provider.

19. A cloud computing system to provide ambient service data to one or more ambient service apparatuses, the one or more ambient service apparatuses to provide ambient services at corresponding premises, the cloud computing system comprising:
a communication management subsystem comprising one or more servers, the communication management subsystem arranged to:
obtain, from respective ambient service apparatuses of the one or more ambient service apparatuses, information pertaining to users located at the corresponding premises, and
send social profiles of the users to the respective ambient service apparatuses for provision of ambient services at the corresponding premises in response to receipt, from the respective ambient service apparatuses, of an indication that one or more users has arrived at the corresponding premises;
one or more hardware accelerators arranged as an interaction inference subsystem, the interaction inference subsystem is arranged to create the social profiles for the users based at least in part on the obtained information, and update respective social profiles in response to receipt, from the respective ambient service apparatuses, of indications of monitored interactions between the users located at the respective premises; and
one or more data storage systems arranged to store a profile database, the profile database to store the social profiles and receive updates to the stored social profiles, wherein the social profiles include data or instructions to indicate actuation of various peripheral devices at the corresponding premises for various interactions between users at the corresponding premises.

20. The cloud computing system of claim 19, wherein the communication management subsystem is arranged to crawl or search for information on the users from one or more online sources, the one or more online sources at least including a social media platform.

21. The cloud computing system of claim 19, wherein the interaction inference subsystem is arranged to initially obtain user preferences for dealing with other users at the premises, and to create the profiles based on the user preferences and the information obtained by a communications module.

22. One or more non-transitory computer-readable storage media comprising instructions, wherein execution of the instructions by one or more processors of an ambient services gateway is to cause the ambient services gateway to:
obtain at least one social profile of a user of a premises, wherein the at least one social profile of the user is associated with provision of ambient services to the user, wherein the user of the premises is an owner of the premises or a visitor to the premises;
generate ambient service instructions for providing the ambient services to the user based at least in part on the at least one social profile and data associated with interactions between the computing device or the user and one or more other persons observed at the premises, wherein the one or more other persons are owners of the premises or visitors to the premises; and
control transmission of the ambient service instructions to one or more peripheral devices at the premises, the ambient service instructions for instructing the one or more peripheral devices to provide the ambient services to the user based at least in part on ambient service instructions.

23. The one or more non-transitory computer-readable storage media of claim 22, wherein execution of instructions is to cause the ambient services gateway to:
  monitor interactions of the user with one or more other users at the premises; and
  control transmission of updated user profile data or user interaction data to a cloud ambient service provider based on the monitored interactions.

\* \* \* \* \*